(12) United States Patent
Goda

(10) Patent No.: US 9,546,909 B2
(45) Date of Patent: Jan. 17, 2017

(54) APPARATUS AND METHODS FOR CONTINUOUS TEMPERATURE MEASUREMENT OF MOLTEN METALS

(71) Applicant: Jyoti Goda, Orissa (IN)

(72) Inventor: Jyoti Goda, Orissa (IN)

(*) Notice: Subject to any disclaimer, the term of this patent is extended or adjusted under 35 U.S.C. 154(b) by 0 days.

(21) Appl. No.: 14/766,595

(22) PCT Filed: Feb. 7, 2014

(86) PCT No.: PCT/IB2014/000675
§ 371 (c)(1),
(2) Date: Aug. 7, 2015

(87) PCT Pub. No.: WO2014/122532
PCT Pub. Date: Aug. 14, 2014

(65) Prior Publication Data
US 2015/0377710 A1    Dec. 31, 2015

(30) Foreign Application Priority Data
Feb. 8, 2013  (IN) ............................. 155/KOL/2013

(51) Int. Cl.
*G01J 5/08*   (2006.01)
*G01J 5/00*   (2006.01)
*G01J 5/04*   (2006.01)
*G01J 5/02*   (2006.01)
*G01J 5/06*   (2006.01)
*G01J 5/34*   (2006.01)

(52) U.S. Cl.
CPC ............. *G01J 5/0821* (2013.01); *G01J 5/004* (2013.01); *G01J 5/029* (2013.01); *G01J 5/041* (2013.01); *G01J 5/046* (2013.01); *G01J 5/061* (2013.01); *G01J 5/34* (2013.01); *G01J 2005/0048* (2013.01)

(58) Field of Classification Search
CPC .......... G01J 5/004; G01J 5/041; G01J 5/0821; G01J 5/046; G01J 5/029; G01J 5/061
See application file for complete search history.

(56) References Cited

U.S. PATENT DOCUMENTS

| | | | |
|---|---|---|---|
| 4,444,516 A | 4/1984 | Dostoomian et al. | |
| 5,388,908 A | 2/1995 | Kendall | |
| 5,585,914 A | 12/1996 | Yamasaki et al. | |
| 6,357,910 B1 | 3/2002 | Chen et al. | |
| 2003/0197125 A1 | 10/2003 | De Saro et al. | |
| 2005/0175065 A1 | 8/2005 | Coleman | |

(Continued)

OTHER PUBLICATIONS

PCT/IB2014/000675, Dec. 19, 2014, International Search Report.
(Continued)

*Primary Examiner* — David Porta
*Assistant Examiner* — Faye Boosalis
(74) *Attorney, Agent, or Firm* — Wolf, Greenfield & Sacks, P.C.

(57) ABSTRACT

Optical probes and methods for continuously measuring the temperature of molten metals in vessels are described. The optical probe may include a fiber surrounded by a protective structure that is mounted in a wall of a vessel. The protective structure may include a porous body for flowing gas through the optical probe assembly. A portion of the optical probe may be sacrificial and erode or break away during temperature measurements. Calibrations may be used to correct temperature measurements based on an amount of erosion or removal of the optical fiber.

48 Claims, 7 Drawing Sheets

(56) References Cited

U.S. PATENT DOCUMENTS

2006/0008211 A1  1/2006  Kono
2009/0074028 A1  3/2009  Lamp et al.
2010/0207306 A1  8/2010  Kendall
2011/0280278 A1  11/2011  Cuypers et al.

OTHER PUBLICATIONS

International Search Report dated Dec. 19, 2014 from corresponding International Application No. PCT/IB2014/000675.
Kendall, M. et al., A Window Into the Electric Arc Furnace, a Continuous Temperature Sensor Measuring the Complete Furnace Cycle, Archives of Metallurgy and Materials, Apr. 3, 2008, pp. 451-454, vol. 53-Issue 2.

APPARATUS AND METHODS FOR CONTINUOUS TEMPERATURE MEASUREMENT OF MOLTEN METALS

CROSS REFERENCE TO RELATED APPLICATIONS

This application is a National Stage of International Application No. PCT/IB2014/000675, filed Feb. 7, 2014, which claims priority to Indian Patent Application No. 155/KOL/2013, filed Feb. 8, 2013, each of which is hereby incorporated by reference in its entirety.

TECHNICAL FIELD

The technology relates to metal manufacturing, and to optical temperature probes and methods for continuously measuring high-temperature molten metals in vessels containing molten metals. The temperature measurements may be based on optical pyrometry.

BACKGROUND

The manufacturing of metals can involve several stages of handling molten metal. Metal compositions may be melted in a first vessel and transferred to one or more vessels during a metal manufacturing process. For example, a metal composition may be first heated in a furnace, and transferred to a ladle and then to a caster or tundish where it is poured into moulds or a final product. At each stage of a metal manufacturing process, the temperature of the melt may be held at a target temperature for a period of time. Appreciable temperature deviations from a target temperature may adversely affect the quality of the final metal product. Accordingly, it is desirable to monitor, as accurately as possible, a temperature of the molten metal through the metal manufacturing process.

Several types of temperature measurement techniques have been developed for measuring high temperatures of molten metals. One approach is to use thermoelectric devices, e.g., thermocouples. Measurements with thermocouples may involve fixing the thermocouple at the end of a long lance, and dipping the thermocouple into the molten metal to measure the temperature of the melt. This is conventionally done in an intermittent fashion. Disadvantages with intermittent measurement of temperature is that the manufacturing process may be interrupted for the measurement, and there may be substantial time intervals between the measurements so that close process control may not be possible.

Optical-pyrometry-based techniques have been developed for measuring the temperature of liquid metals. Such techniques can provide faster measurements of temperatures, although the techniques used also provide intermittent measurements. Conventional optical measurements comprise piercing an optical probe, mounted on a lance, through a layer of slag covering the metal. The slag and measurement technique can lead to high wear and a short lifetime of the probe.

The use of thermocouples for temperature measurements of molten metal compositions may have additional disadvantages. For example, thermocouples are not entirely immune to electromagnetic radiation, and typically have slow response times. In addition, they are not adaptable to repeated continuous measurement applications, since they undergo degradation with time at high temperature. Thermocouples cannot be brought into direct contact with the molten metal and require some protective covering material, such as refractory sheathing, to protect the thermocouple from the high-temperature melt and to prevent the thermocouple signals from being short circuited and dissipated into the molten metal. A protective refractory covering should be both thick enough, so that the thermocouple is not exposed to the melt, and thin enough, so that temperature of the melt can be accurately measured by the thermocouple. Accordingly, there are conflicting requirements on the thickness of the thermocouple's protective covering.

The protective material covering a thermocouple can be worn off by the molten metal with repeated use, which can introduce measurement errors over time. In addition, the erosion rate may depend upon the type of metal being processed, the temperature of the molten metal, and the vessel or environment in which the measurement is made. For example, in the case of molten steel, the rate of erosion is low in the tundish while it can be high in a ladle and the furnace. Erosion through the protective material can render the thermocouple inoperable. Therefore, different thicknesses of protective covering may be required for different metals and environments, making manufacture of a thermocouple temperature probe difficult.

SUMMARY

Various optical probes and measurement methods are described that can be employed for continuous temperature measurements of molten metals in vessels containing the molten metals. Temperature measurements with the optical probes may be based on optical pyrometry. An optical probe can be mounted in a vessel wall, and include an optical fiber arranged to directly contact or view the molten metal for a more reliable and accurate temperature sensing of the molten metal. The optical probes may include sections that are worn away by normal use, e.g., sacrificial portions or sections, and include calibration data to account for the removal of the sacrificial sections. The optical probes and related temperature sensing systems may be used for repeated and continuous measurement of molten metals throughout metal manufacturing processes.

According to some embodiments, an optical probe for mounting in a vessel wall to measure temperature of molten metal contained in the vessel may comprise an optical fiber having a detection end, a protective body surrounding sidewalls of the optical fiber, and a sacrificial portion of the optical fiber and protective body. The optical probe may further include an outer casing connected to at least the protective body and include a fastening mechanism for mounting the optical probe to the vessel wall. The protective body may not cover the detection end of the optical fiber. When mounted in the vessel wall, the detection end of the optical fiber may be approximately flush with an inner surface of a refractory lining of the vessel wall.

According to some aspects, the sacrificial portion optical probe comprises zirconia ferrules assembled along the optical fiber. In some aspects, the sacrificial portion comprises a length of the protective body having regularly spaced notches. The optical fiber may be scored at regular intervals to facilitate cleavage of the optical fiber, in some implementations.

According to some aspects, the optical fiber comprises sapphire, quartz, fused silica, or magnesium fluoride. In some implementations, the protective body comprises any one or combination of: zirconia, magnesia partially stabilized zirconia, calcia partially stabilized zirconia, yttria partially stabilized zirconia, alumina, graphite, boron nitride, magnesia, silica, and magnesia carbon.

In some implementations, an optical probe may further comprise a porous body surrounding the protective body, wherein the porous body comprises at least one refractory material. The porous body may comprise any one or combination of: alumina, magnesium oxide, magnesia carbon, silica, graphite, and spinel. in some aspects, the porous body is cylindrical in cross section. In some implementations, only a portion of the porous body is porous. According to some implementations, the porous body is asymmetric in cross section.

According to some aspects, an optical probe may further comprise a fiber connector at a distal or transmission end of the optical fiber opposite the detection end, wherein the fiber connector is configured to connect a transmission optical fiber to the optical probe such that radiation form the probe's optical fiber couples to a fiber core in the transmission optical fiber.

In some implementations, an optical probe may include optical detection apparatus configured to receive radiation from the transmission optical fiber and compute a temperature of the molten metal based upon the received radiation. In some aspects, the optical probe may be provided with temperature calibration factors dependent upon a time of exposure of the optical probe to molten metal or length of the optical fiber remaining in the probe after removal of sacrificial portions. The calibration factors may be provided to optical detection apparatus that may use the temperature calibration factors to improve the accuracy of calculated temperatures.

In some implementations, an outer casing of an optical probe includes a flange or other feature (e.g., a line or mark) that registers the optical probe to an exterior wall of the vessel, and wherein an insertion length L of the optical probe extending beyond the flange or feature is approximately equal to a thickness of the vessel wall. In some aspects, the length L is between 50 mm and 1000 mm. In some implementations, when mounted in the vessel wall, the detection end of the optical probe is approximately flush with an inner surface of the vessel wall. In some implementations, when mounted in the vessel wall, the detection end of the optical probe is recessed between 1 mm and 10 mm from the inner wall of the vessel. In some implementations, when mounted in the vessel wall, the detection end of the optical probe extends between 5 mm and 30 mm from the interior surface of the vessel towards the melt.

According to some aspects, an optical probe may further comprise a brick of refractory material, wherein the brick has a hole extending through the brick into which the portion of the optical probe extending beyond the flange may be inserted. In some implementations, the brick comprises any one or combination of: alumina, magnesium oxide, magnesia carbon, zirconia, magnesia partially stabilized zirconia, calcia partially stabilized zirconia, yttria partially stabilized zirconia, scandia partially stabilized zirconia, graphite, boron nitride and spinel. In some implementations, the brick comprises a recess around the hole on at least one side of the brick. In some aspects, the recess has a transverse dimension greater than a depth into the brick. In some aspects, sidewalls of the recess slope outward toward an outer surface of the brick. In some implementations, the brick has a thickness that is greater than a thickness of a refractory lining of the vessel.

The foregoing aspects and implementations associated with an optical probe may be used in any combination and in any embodiment of an optical probe adapted for mounting in a vessel wall to measure temperature of molten metal contained in the vessel.

According to some embodiments, a method for measuring temperature of molten metal contained in a vessel may comprise receiving an optical signal at a detection end of an optical fiber that is mounted in a vessel wall. The detection end of the optical fiber may be proximal an inner surface of the vessel wall. The method may further comprise processing the optical signal to calculate a temperature of the molten metal, identifying a calibration factor corresponding to a change in optical fiber length during a measurement interval or time of use of the optical probe up to the measurement interval, and adjusting the calculated temperature based on the calibration factor.

According to some aspects, a method of measuring temperature may further comprise blowing gas through a porous body surrounding sidewalls of the optical fiber at a first pressure when removing molten metal from the vessel, so as to prevent debris from attaching to the detection end of the optical fiber. In some implementations, the method comprises not blowing gas through the porous body when measuring a temperature of the molten metal. In some aspects the porous body comprises at least one refractory material. In some implementations, a method of measuring temperature may comprise blowing gas through the porous body at a second pressure that is less than the first pressure when measuring a temperature of the molten metal.

In some implementations, a method of measuring temperature may further comprise blowing gas through the porous body for a first time interval, not blowing gas through the porous body during a second time interval when measuring a temperature of the molten metal, and repeating the acts of blowing gas for the first time interval and not blowing gas for the second time interval to repeatedly measure the temperature of the molten metal. In some aspects, the second time interval is shorter than the first time interval. In some aspects, the gas blown through the porous body for the first time interval is blown at a pressure that prevents the molten metal from contacting the detection end of the optical fiber.

According to some aspects, a method of measuring temperature may further comprise blowing gas through the porous body at a second pressure that is less than the first pressure for a first time interval, not blowing gas through the porous body during a second time interval when measuring a temperature of the molten metal, wherein the second time interval is shorter than the first time interval, and repeating the acts of blowing gas for the first time interval and not blowing gas for the second time interval to repeatedly measure the temperature of the molten metal. In some implementations, only a portion of a protective structure around the fiber is porous and the gas blown through the porous body exits into the vessel from one side of the optical probe. In some aspects, the gas exits on a side of the optical probe that is above the optical fiber.

In various aspects of a method of measuring temperature, the temperature is representative of a temperature in an arc furnace, a converter, a basic oxygen furnace, a ladle, or a tundish used in metal manufacturing. According to some aspects, the temperature is determined by optical pyrometry. In some implementations, the optical fiber comprises sapphire, quartz, fused silica, or magnesium fluoride.

The foregoing aspects an implementations associated with a method of measuring temperature may be implemented in a method of measuring temperature in any suitable combination.

Further embodiments include a vessel for melting metals. The vessel may comprise a wall for containing molten metal having an exterior surface and an interior surface, and an optical probe mounted in the wall for measuring temperature. The optical probe may comprise an optical fiber having a detection end, a protective body surrounding sidewalls of the optical fiber, a sacrificial portion of the optical fiber and protective body, and an outer casing connected to at least the protective body and including a fastening mechanism or feature. The fastening mechanism or feature may be adapted for mounting the optical probe to the vessel wall and/or registering a position along the length of the probe to the exterior surface of the vessel. The protective body may not cover the detection end of the optical fiber, and the detection end of the optical fiber may be approximately flush with the interior surface of the vessel.

According to some aspects, the optical probe further comprises a gas inlet and a porous body for blowing gas through the optical probe to the detection end of the optical fiber. In some implementations, the vessel comprises a recess in the interior surface at the optical probe, and the detection end of the optical fiber is recessed between 1 mm and 10 mm from the interior surface. In some implementations, the detection end of the optical fiber and the protective body extends inward beyond the interior surface of the vessel and are supported by refractory material. In some aspects, the refractory material includes a recess in which the detection end of the optical fiber is located. In some implementations, the recess has a transverse dimension greater than a depth into the vessel wall.

The foregoing aspects and implementations associated with a vessel for containing molten metal and an optical probe may be used in any combination and in any embodiment of a vessel for melting metals.

The foregoing and other aspects, embodiments, implementations, and features of the present teachings can be more fully understood from the following description in conjunction with the accompanying drawings.

BRIEF DESCRIPTION OF DRAWINGS

A person skilled in the art will understand that the figures, described herein, are for illustration purposes only. It is to be understood that in some instances various aspects of the embodiments may be shown exaggerated or enlarged to facilitate an understanding of the embodiments. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

Figure 1:
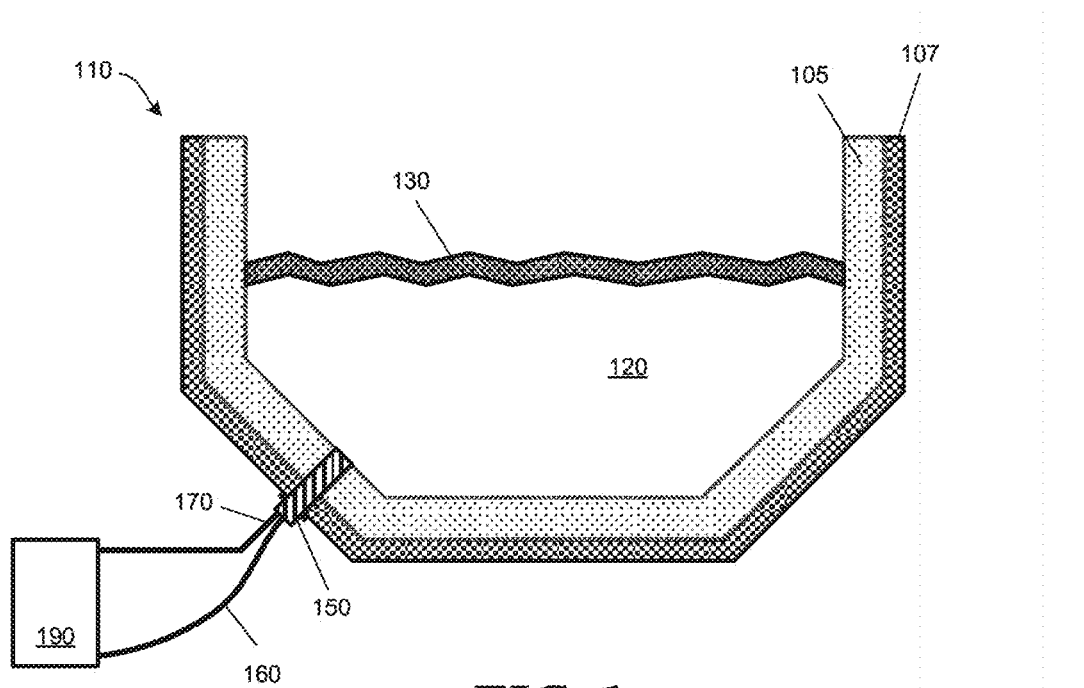
FIG. 1 depicts a vessel containing a molten metal wherein an optical probe is mounted in the vessel wall, according to some embodiments.

The features and advantages of the embodiments will become more apparent from the detailed description set forth below when taken in conjunction with the drawings.

DETAILED DESCRIPTION

During the manufacture of metals, it can be beneficial to monitor the temperature of molten metal throughout the manufacturing process, e.g., during the initial heating of a metal composition in a furnace, during transfer in a ladle, and during a casting process. Accurate knowledge of the liquid metal temperature can improve the quality of the end product as well as the productivity of the metal plant. For example, in some steel manufacturing processes, a melt may be raised to a temperature of about 1650° C. and maintained at that temperature two within about ±5° C. for a period of time. At a later stage, e.g., in a tundish or caster, the melt may be maintained at a temperature between about 1520° C. to about 1550° C., depending on the metal composition, within a temperature tolerance of ±1° C. Deviations from the target temperature in a caster can adversely affect the flowing of the liquid metal during the casting process. If the temperature is too low, freeze out may occur and the metal cannot be casted. If the temperature is too high, the liquid metal may not solidify properly during the casting process. Temperature errors in a casting process can ruin the ability to cast the metal, resulting in a unusable batch that must be reprocessed. Additionally, for some metal manufacturing systems, unnecessarily high temperatures can consume a few megawatts of power for each degree Celsius that the metal is overheated, leading to a waste of energy and money. Excess heating can further result in using excess alloys, excessive refractory wear, and also metal loss. Underheating can result in insufficient processing of metals, which can result in rejection of an entire batch.

The present technology relates to apparatus and methods for continuously measuring high temperatures of molten metals in vessels used for metal manufacturing processes. An optical probe that includes an optical fiber may be mounted in a wall of a vessel containing the molten metal, so that an end of the optical fiber receives radiation from the liquid metal. The radiation may be carried via optical fiber to an instrument that analyzes the radiation based on optical pyrometry, so as to obtain a temperature of the liquid metal. In some embodiments, the optical probe and temperature measurement are used continuously to monitor the temperature of the liquid metal throughout the metal manufacturing process. Optical probes may be mounted in different vessels used in the metal manufacturing process, e.g., an arc furnace, a converter, a basic oxygen furnace, a ladle, a tundish, or any other suitable vessel for containing molten metal. An optical probe may be used for continuous temperature measurements on different batches of metals that may be processed in successive runs. Continuous measurement of liquid metal temperatures can provide close process control of the manufacturing process, improve the quality of the manufactured product, and reduce production costs.

According to some embodiments, an optical probe includes a sacrificial portion or sacrificial sections that are designed to wear away during normal continuous use of the probe while minimally affecting the accuracy of temperature measured with the probe. Calibration factors may be included with a probe to account for the removal of the sacrificial sections. In some embodiments, a refractory brick that accommodates a portion of the probe may be included with the probe.

By way of introduction, FIG. 1 depicts a vessel 110 in which an optical probe 150 is mounted. The vessel may be any vessel that is adapted to contain molten metal 120. In some implementations, slag 130 may be present over the molten metal 120. The molten metal may comprise any composition used in the manufacture of commercial or specialized metals. The optical probe 150 may be mounted in a sidewall or bottom wall of the vessel 110. In some embodiments, the vessel 110 may include a draining mechanism at a lower region of the vessel.

The vessel may be a vessel of a furnace (e.g., an arc furnace, a basic oxygen furnace, a gas furnace, etc.) that is used to heat a metal composition, a ladle, a tundish, a mould in which metal is cooled, or any other suitable vessel for containing molten metal. In some embodiments, the vessel 110 comprises a outer shell 107 having an exterior surface of the vessel. The outer shell may be formed of metal. The vessel may include an inner lining 105 having an interior surface of the vessel. The inner lining may be formed of refractory material (e.g., refractory brick or refractory concrete). At least one hole may be present in the vessel's outer shell 107 to accommodate an optical probe 150. The optical probe 150 may be inserted in the hole and fastened to the vessel wall (either to one or both of the outer shell 107 and inner lining 105). In some embodiments, the optical probe 150 may be adapted to be readily removed and replaced. For example, the optical probe may be fastened to the outer shell with screws or a locking mechanism that can be undone when replacing the optical probe.

There may be one or more connections to the optical probe 150. In some embodiments, an transmission optical fiber 160 may connect to the optical probe 150 via a fiber connector. Radiation received by the optical probe from the molten metal 120 may be transmitted via the transmission optical fiber 160 to an instrument (e.g., an optical pyrometer) for analysis. In some embodiments, a gas line 170 may connect to the optical probe 150 via a gas inlet connector. Gas may be blown into and through the optical probe, in some embodiments, to cool the probe components and/or to clear debris from a detection end of the optical probe. In some implementations, gas may not be blown into the probe, and there may be no gas connector on the optical probe 150. According to some embodiments, signal analysis and control apparatus 190 may be connected to the transmission optical fiber 160 and gas line 170.

Figure 2A:
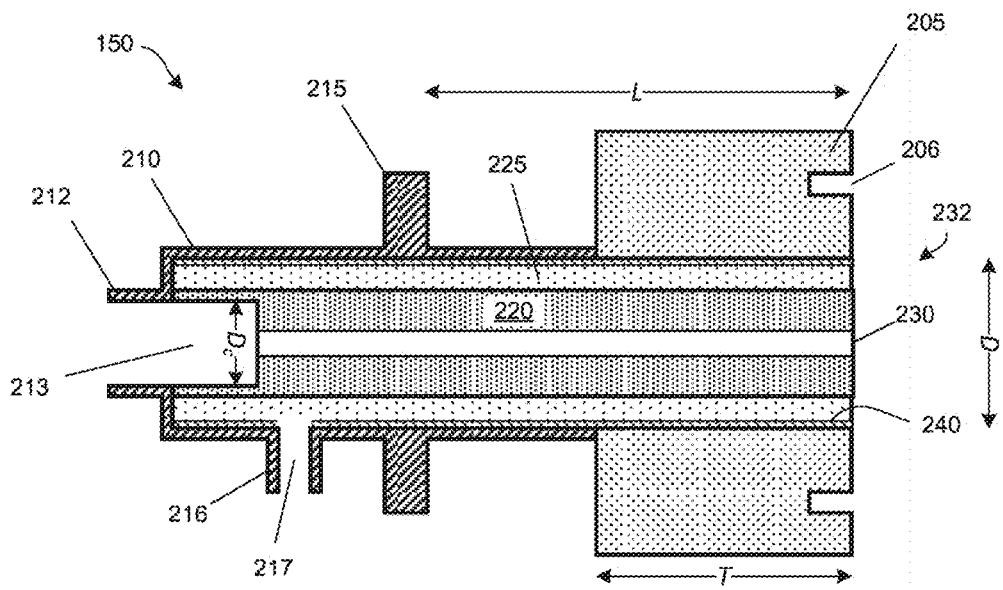
FIGS. 2A-2C depict optical probe components for continuous temperature measurements of molten metals, according to some embodiments.

FIGS. 2A-2C and FIGS. 3A-3D depict various embodiments of optical probes and probe components in further detail. Referring to FIG. 2A, an optical probe 150 may comprise an optical fiber 230, a protective structure around the optical fiber, and an outer casing 210. The optical probe 150 may have a detection end 232 that is opposite a distal end of the probe. In some embodiments, the optical fiber 230 comprises a sapphire fiber that is capable of withstanding temperatures of up to about 2300° C. A sapphire fiber may withstand repeated use for continuous temperature measurements in separate batches or metal runs, e.g., more than 20 runs in some embodiments, more than 50 runs in some embodiments, more than 100 runs in some embodiments, more than 200 runs in some embodiments, more than 500 runs in some embodiments, and yet more than 1000 runs in some embodiments. In some implementations, the refractory material of the probe (and therefore the probe) may last up to 400 runs in an arc furnace used in steel manufacturing. In a basic oxygen furnace used for steel manufacturing, the probe may last for up to 5000 runs. In some implementations, the optical fiber may comprise quartz, fused silica, or magnesium fluoride, though other materials may be used in other embodiments. The material selected for the fiber will have a higher melting temperature than that of the molten metal 120. For example, a quartz fiber may be selected for aluminum or low-temperature steel melts, whereas a sapphire fiber may be used for high-temperature steel melts.

The fiber 230 may have a diameter between about 0.05 mm and about 5 mm, though smaller or larger diameters may be used in other embodiments. The fiber 230 may have a circular cross section, or may have a polygonal cross section, although other cross-sectional shapes may be used in some embodiments. The detection end of the optical fiber may receive infrared and visible radiation from the molten metal that is representative of blackbody conditions in the melt. Because the fiber is in direct contact with the melt through the vessel wall, it is essentially immune from interfering ambient radiation that could cause temperature errors.

According to some embodiments, the protective structure around the fiber may comprise a protective body 220 and a porous body 225. A transverse dimension D of the protective structure may be between about 5 mm and about 50 mm, in some embodiments. The protective structure may not include a porous body 225, in some embodiments. The protective body may comprise any suitable high temperature or refractory material (e.g., any one or combination of: zirconia, magnesia partially stabilized zirconia, calcia partially stabilized zirconia, yttria partially stabilized zirconia, alumina, graphite, boron nitride, magnesia, silica, and magnesia carbon). Zirconia has improved non-stick properties, and may reduce metal or slag sticking to the surface of the fiber 230 and obstructing the fiber's receiving aperture. In some embodiments, the optical probe may include a porous body 225, so that a gas may be blown through a length of the optical probe and into the molten metal. The porous body 225 may be located outward or inward of the protective body 220 around the optical fiber. The porous body 225 may be formed of any suitable high temperature or refractory material (e.g., alumina, magnesium oxide, magnesia carbon, silica, graphite, and spinel). The porous body 225 may serve two purposes: a) provide for gas cooling of the optical fiber and b) provide for blowing away any slag that might stick to the detection end of the optical fiber.

In some embodiments, only a portion of the protective body may be porous, so as to direct the gas flow through the porous body at a particular orientation. For example, a porous portion of the protective body may be formed on one side of the protective body, so as to direct gas out of the detection end 232 of the probe on one side of the optical fiber 230.

The protective body and/or porous body may be any suitable shape, and may have a cross-section shape that is circular, rectangular, polygonal, or oval, and may be asymmetric in some embodiments. The protective body 220 and/or porous body 225 may provide support for brittle optical fibers.

Figure 2B:
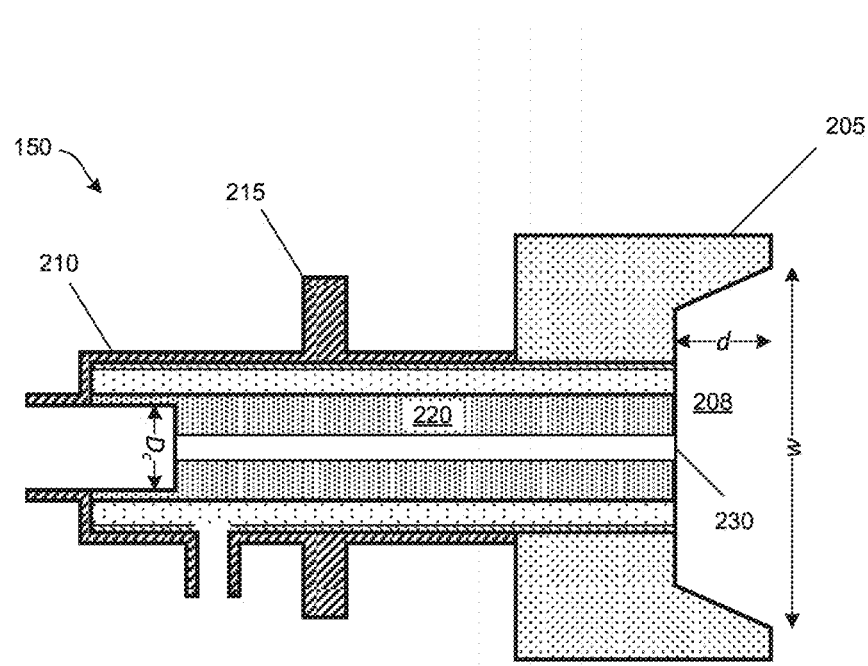
Figure 2C:
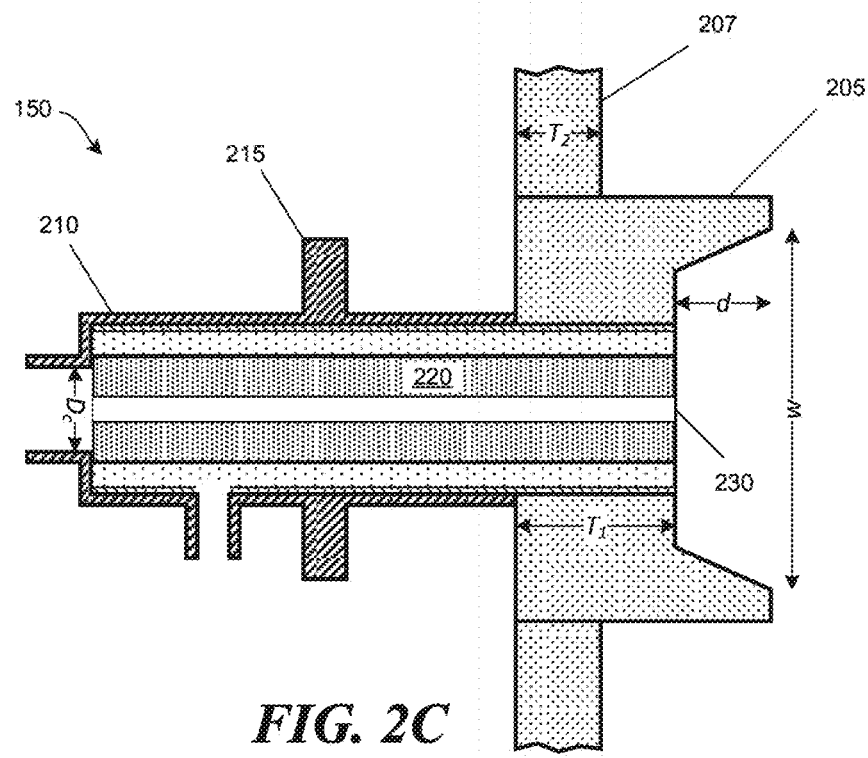

In some embodiments, a cavity 213 having a transverse dimension $D_c$ may be formed at a distal end of the protective body 220 and/or the porous body 225, so as to accept a fiber connector of the transmission optical fiber 160. The fiber connector (not shown) may allow coupling of a signal from the probe's optical fiber 230 to the transmission optical fiber 160. The transverse dimension $D_c$ may be less than, equal to, or greater than a transverse dimension of the optical fiber 230. In some implementations, the transverse dimension $D_c$ may be equal to or greater than a transverse dimension of the optical fiber 230, so as to improve coupling efficiency of radiation between the optical fiber 230 and core of the transmission optical fiber 160. In some implementations, the outer casing 210 may include a fiber connecting feature 212 that is adapted to fasten a fiber-connecting end of the transmission optical fiber 160 to the optical probe 150. In some embodiments, the cavity 213 may not be formed in the protective body 220, as depicted in FIG. 2C.

The optical probe 150 may include a gas connector 216 and gas inlet port 217 formed in, or attached to, the outer casing 210. A gas tube may connect to the gas connector 216 with a tight seal, so as to resist the outflow of gas at the gas connector 216. Similarly, in some embodiments, a fiber chord 160 may connect to the fiber connector 212 with a tight seal, so as to resist the outflow of gas at the fiber connector 212. The outer casing may form a seal with the outer shell 107 of the vessel, so as to resist the outflow of gas external to the vessel and improve the flow of gas through the body of the optical probe and out the detection end 232 of the probe. Although the gas connector is shown on a side of the optical probe, it may be located at the distal end of the probe, near the fiber connecting feature 212.

According to some embodiments, the fiber connection need not be air tight. Instead, the porous body 225 is sealed on outer surfaces by the outer casing 210 and is sealed inwardly by the protective body 220, as depicted in FIGS. 2A-2C. Thus, gas blown into the porous body 225 at the gas inlet port 217 will exit through the detection end 232 of the optical probe.

In some embodiments, the outer casing 210 may be formed of any suitable metal or high-temperature composite. The outer casing 210 may be press fit over the protective body 220, in some implementations, or may be adhered to the protective body with any suitable adhesive or refractory cement. According to some embodiments, the outer casing 210 may extend along the full length of the optical probe body, but not cover the detection end 232 of the probe. In some embodiments, the outer casing 210 may extend only part way along the length of the optical probe body, as depicted in FIGS. 2A-2C.

The outer casing 210 may include a flange 215 or suitable mating feature that registers and/or enables attaching the optical probe to the vessel's outer shell 107. The optical probe may extend a length L beyond the flange. The length L may be approximately equivalent to the combined thicknesses of the vessel's outer shell 107 and inner refractory lining 105, so that a detection end 232 of the optical probe 150 is approximately flush with an inner surface of the refractory lining, as depicted in FIG. 1. In some embodiments, the length L may be a standard length that is common for vessels used in metal manufacturing. The length L may be between approximately 50 mm and approximately 1000 mm, in some optical probes 150. In other embodiments, the length L may be greater than or less than the combined thicknesses of the vessel's outer shell 107 and inner refractory lining 105. According to some embodiments, the length L may be between approximately 5 mm and approximately 30 mm greater than the combined thicknesses of the outer shell and inner lining, so that the detection end of the optical probe extends into the liquid metal by this distance.

According to some embodiments, an optical probe 150 may include a lining 240 around the protective structure. In some implementations, the lining 240 may comprise a thin metal that helps direct gas flow through the protective body 220. In some implementations, the lining may comprise a high-temperature composite.

In some embodiments, a refractory brick 205 may be provided with an optical probe 150. The refractory brick may be made of any suitable material (e.g., any one or combination of: alumina, magnesium oxide, magnesia carbon, zirconia, magnesia partially stabilized zirconia, calcia partially stabilized zirconia, yttria partially stabilized zirconia, scandia partially stabilized zirconia, graphite, boron nitride and spinel). In some implementations, the brick 205 may have a thickness T that is approximately equal to a thickness of refractory bricks used in the inner lining 105 of the vessel 110. In some embodiments, the thickness T of the brick may be equal to or less than the total thickness of the refractory lining 105 of the vessel 110. In some embodiments, the thickness T of the brick may be greater than the total thickness of the refractory lining 105 of the vessel 110.

The refractory brick may be in any suitable shape, and may include a hole into which the detection end 232 of the optical probe 150 fits. In some embodiments, the refractory brick may not be attached to the optical probe, so that the brick 205 may be placed in the inner lining 105 of the vessel 110 and the optical probe inserted through the outer shell 107 and into the hole in the brick 205. In other embodiments, the refractory brick 205 may be securely attached to the optical probe, and the distal end of the optical probe may be sized and shaped to fit through an opening in the outer shell 107 of the vessel. An adapting or sealing plate may be provided with the optical probe for forming a seal between the probe and outer shell's exterior surface.

The refractory brick 205 may, or may not, include a recess 206 for mounting a cover over the detection end 232 of the optical probe. In some embodiments, a cover may be provided with the optical probe 150, that is used to protect the detection end of the probe when the lining 105 of the vessel is being serviced or replaced (e.g., in a gunning process or brick replacement process). In case any gunning operation for refractory maintenance is required to be carried out by spraying or other means to build up the broken/damaged refractories, a cap-like covering over the detection end 232 of the optical fiber 150 is provided. This can prevent refractory material that may be sprayed during the process from building-up and covering the receiving end of the optical fiber. In some implementations, a refractory brick 205 may not be provided with the optical probe, and a cover may be provided that fits over the detection end 232 of the probe. Such implementations may be used for vessel linings 105 that consist of refractory cement that is sprayed into the outer shell.

In various embodiments, the materials of the optical probe 150 at the detection end 232 may be sacrificial. For example, lining 240, protective body 220, porous body 225, and the optical fiber 230 may erode during continuous temperature measurements. The erosion process may not appreciably interfere with the temperature measurement process in some embodiments, because the erosion continuously exposes a fresh face of the optical fiber.

In some embodiments, a measured temperature may be depend, at least in part, on a length of the optical fiber 230. Fiber-length temperature dependencies may be compensated for with calibration factors. For example, trial runs may determine differences between measured temperature with an optical fiber and a thermocouple as a function of length of the optical fiber. Further, erosion rates of the optical probe may be determined in trial runs for various liquid metals and temperatures. From these trial runs, calibration factors may be tabulated for an optical probe that are dependent on time of use (or exposure to a liquid metal) of the optical probe. The calibration factors may be provided as a data look-up table or as equations that may be loaded onto a data processing system of an optical pyrometry instrument, for example, and applied automatically during temperature measurements.

FIG. 2B depicts another embodiment of an optical probe 150. According to some embodiments, a refractory brick 205 may be provided with an optical probe that includes a recess 208 at the detection end 232 of the optical probe. The recess 208 may have a transverse dimension w that is greater than a depth d into the brick. The depth of the recess d may be between about 1 mm and about 10 mm. The sidewalls of the recess may be sloped outwards towards the molten metal so as to improve flow of molten metal across the fiber 230 with less turbulence, and to facilitate release of material that may accumulate in the recess. In some embodiments, the sidewalls of the recess 208 may not be sloped.

According to some embodiments, the recess 208 may be used to protect the detection end 232 of the optical probe between batches. For example, at the end of a melt, liquid metal in the recess may cool and solidify as the liquid metal is removed from the vessel. In some implementations, gas may be blown at a low pressure through the porous body 225 to facilitate cooling of metal in the recess. Once solidified, the metal covering may protect the detection end of the optical probe 150 during a reloading of metal ingots into the vessel. Upon heating, any metal in the recess 208 may liquefy and be removed. Alternatively or additionally, gas may be blown through the optical probe 150 to blow off a metal covering in the recess, or to prevent slag from entering the recess.

FIG. 2C depicts an embodiment in which a thickness $T_1$ of the refractory brick is made to be greater than a thickness $T_2$ of the refractory lining 207 of the vessel 110. The thickness $T_2$ of the refractory brick 205 may be made greater, so as to extend the detection end 232 of the optical probe further into the melt. Extension further into the melt may reduce temperature errors due to cooling affects from the vessel wall and may provide a more accurate reading of the melt's temperature. The refractory brick may, or may not, include a recess 208.

Figure 3A:
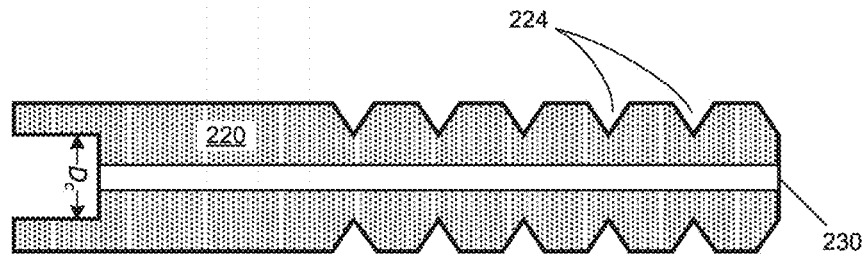
FIGS. 3A-3D depict optical probe components for continuous temperature measurements of molten metals, according to some embodiments.
Figure 3B:
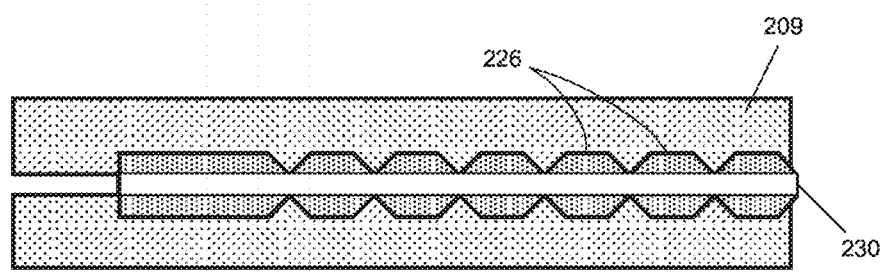
Figure 3C:
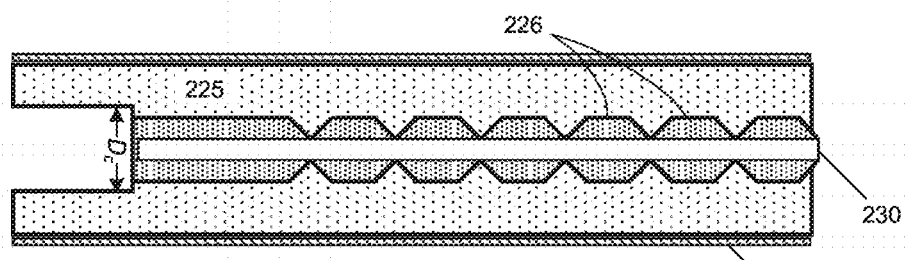
Figure 3D:
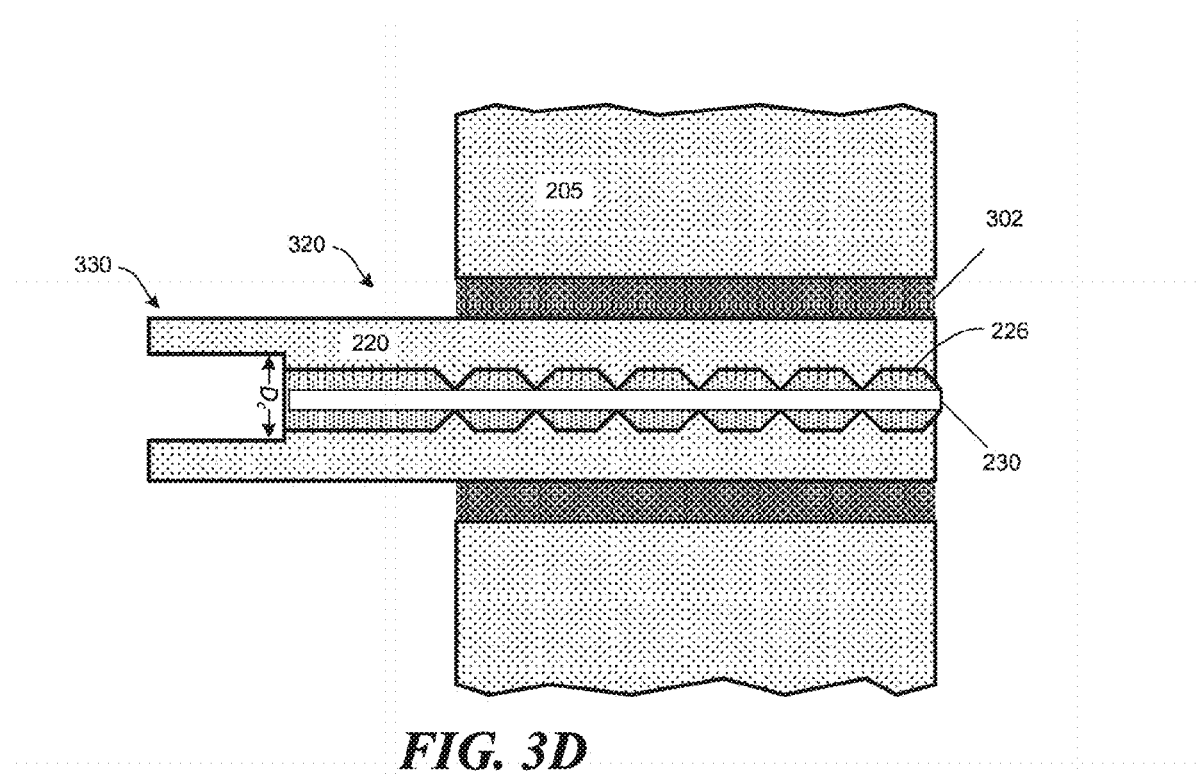

FIGS. 3A-3D depict further refinements of optical probe components. Any of the embodiments depicted in FIGS. 3A-3D may be used in combination with an outer casing 210 and refractory bricks 205 illustrated in FIGS. 2A-2C. In some embodiments, the structures shown in FIGS. 3A-3C may be mounted in a refractory brick, as depicted in FIG. 3D, with or without a porous body 225 or outer lining 240.

Referring to FIG. 3A, according to some embodiments, a protective body 220 may include notches 224 at a sacrificial end of the optical probe 150. The notches 224 may surround the protective body 220, in some embodiments, and create weak points in the protective body. The protective body 220 may be more wear resistant than a refractory brick 205, porous body 225, and/or inner lining 105 of the vessel. As the brick or inner lining erode, sections of the protective body 220 between the notches 240 may be exposed to the melt and break off, exposing a fresh face of the optical fiber. In some embodiments, the sections may break off due to liquid flow or turbulence in the melt. The distance between the notches, or lengths of the sacrificial sections, may be between about 2 mm and about 20 mm, though other distances may be used in some embodiments. In some implementations, the sacrificial sections may have a length that becomes substantially exposed during a heating run but do not break off during the run. Instead, the exposed sections may break off, or be broken off between runs, e.g., manually or by reloading of metal ingots into the vessel. In some embodiments, the fiber 230 may be scored (not shown) coincident with each notch, so as to facilitate a flat transverse cleave of the fiber when a section breaks off.

For the embodiment depicted in FIG. 3B, ferrules 226 of refractory material (e.g., zirconia) may be strung over the fiber 230. The ferrules may be of any suitable shape. The ferrules may touch end-to-end, as depicted in the drawing, or there may be a small space between each ferrule along the optical fiber. The fiber 230 may be scored (not shown) at the junction of each ferrule, so as to facilitate a flat transverse cleave of the fiber when a ferrule breaks off. In some embodiments, the zirconia ferrules 226 and fiber 230 are assembled inside a refractory body 209 by any suitable technique, e.g., drilling and jamming with refractory mortar, embedding by pressing/isostatic pressing, casting by castables, etc. The refractory body 209 may not include a porous portion, in some embodiments. The assembled structure may be mounted in a casing 210 or may be mounted in a refractory brick that can be placed in the inner lining 105 of a vessel.

FIG. 3C illustrates an embodiment in which ferrules 226 and optical fiber 230 are assembled into a porous refractory body 225. An outer lining 240 may be included to help direct gas flow along the length of the porous body. The assembled structure may be mounted in a casing 210 or may be mounted in a refractory brick that can be placed in the inner lining 105 of a vessel. According to some embodiments, a protective body 220 may be included around the ferrules.

FIG. 3D depicts an embodiment in which a probe structure 320 (comprising an optical fiber 230, ferrules 226, and protective refractory body 220) is mounted in a refractory brick 205. The probe structure 320 may be press fit into the brick 205 in some embodiments, or may be adhered to the brick with a refractory cement 302. The assembled structure may then be placed in an inner lining 105 of a vessel, with the distal end 330 extending through the outer shell 107 of the vessel. An outer casing 210 may be placed over the distal end and attached to the outer shell 107, in some embodiments. Probe structures according to any of the embodiments shown in the preceding figures may be used in the embodiment depicted in FIG. 3D. Additionally, a recess 208 may be included in embodiments like those shown in FIG. 3D.

Figure 4:
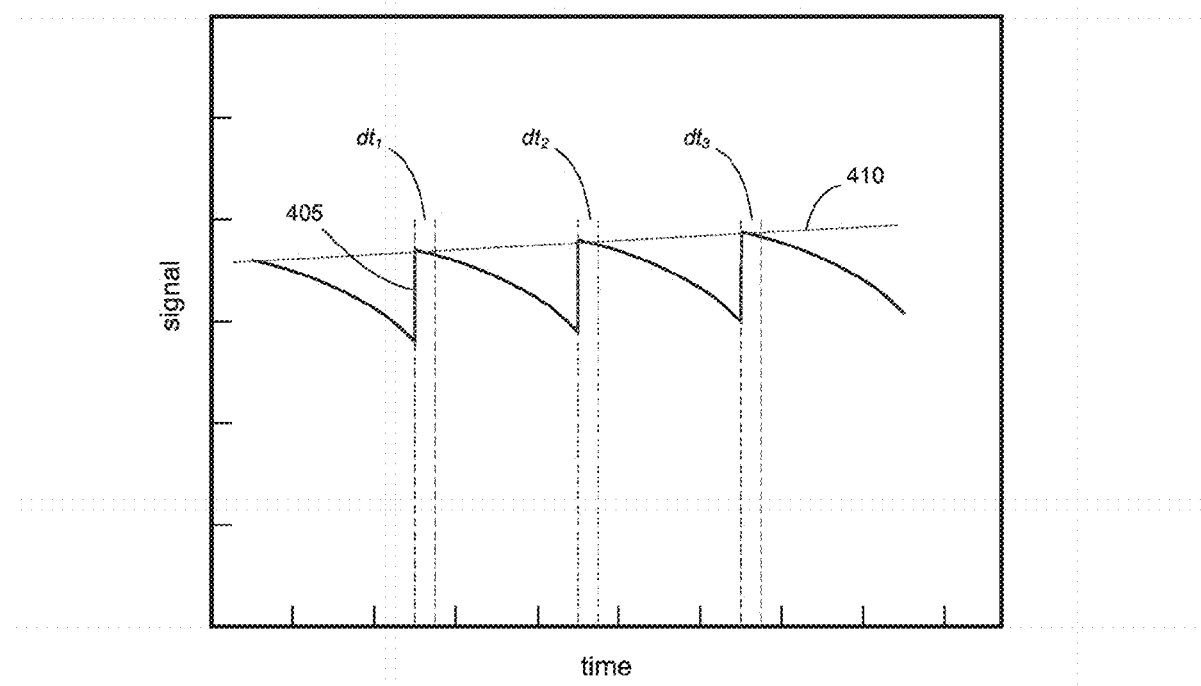
FIG. 4 depicts a graph of a signal from an optical probe as a function of time.

As sacrificial sections of the optical probe 150 break off for the embodiments shown in FIGS. 3A-3D, a measured signal received from the optical fiber 230 may abruptly vary, as depicted in the graph of FIG. 4. For example, a signal strength or a measured temperature may suddenly jump (up or down) as a fresh face of the optical fiber becomes exposed to the melt, as depicted by the abrupt transition 405. Alternatively, a spike in signal level may be detected. In some embodiments, the abrupt transition (or spike) may be detected by a signal processing instrument that receives radiation from the optical fiber. Detection of the transitions 405 may be used to trigger a recalibration of the calculated temperatures, in some embodiments. Because the lengths of the ferrules (or sections between notches) may be known before hand, detection of the transitions 405 can also provide an indication of remaining fiber length, as well as providing a reference signal for selecting appropriate calibration factors. In some embodiments, accurate temperature measurements may be made in, or limited to, short time intervals ($dt_1$, $dt_2$, $dt_3$) after detection of the abrupt transitions 405 when a fresh face of the optical fiber is exposed to the melt.

In some implementations, temperature measurements may be made at points distributed continuously between abrupt transitions 405, and calibrated using temperature data obtained during the short time intervals ($dt_1$, $dt_2$, $dt_3$).

According to some embodiments, longer trends 410 may also be observed by processing a signal that includes the abrupt transitions 405 corresponding to breakage of the fiber 230. For example, a signal strength may increase as the fiber shortens. Functional fits to longer trends may be used in addition to or as an alternative to selecting calibration factors based on abrupt transitions 405, in some embodiments.

An optical detection apparatus may be configured to receive infrared and/or visible radiation incident on the optical fiber 230 that is transmitted (via transmission fiber 160) to the detection apparatus. The detection apparatus may include one or more optical detectors and a grating or wavelength dividing component, so that multiple wavelengths can be monitored. By detecting a range of wavelengths in the incident spectrum, the detection apparatus may correlate the detected wavelengths to that of a black-body emitter to determine the temperature of the molten metal. Since the optical fiber typically has a range of view that may be less than 180°, and is directly viewing the molten metal, the radiation incident on the optical fiber is substantially only black-body radiation from the melt.

In some embodiments, the detection apparatus is adapted to decipher temperature from one or two wavelength readings. In some embodiments, a broad range of the detected spectrum may be analyzed instead of using only one or two wavelengths. Using a broader portion of the spectrum may improve accuracy and reliability of the calculated temperature, and may reduce errors caused by attenuation due to partial obstruction of the fiber end.

Figure 5:
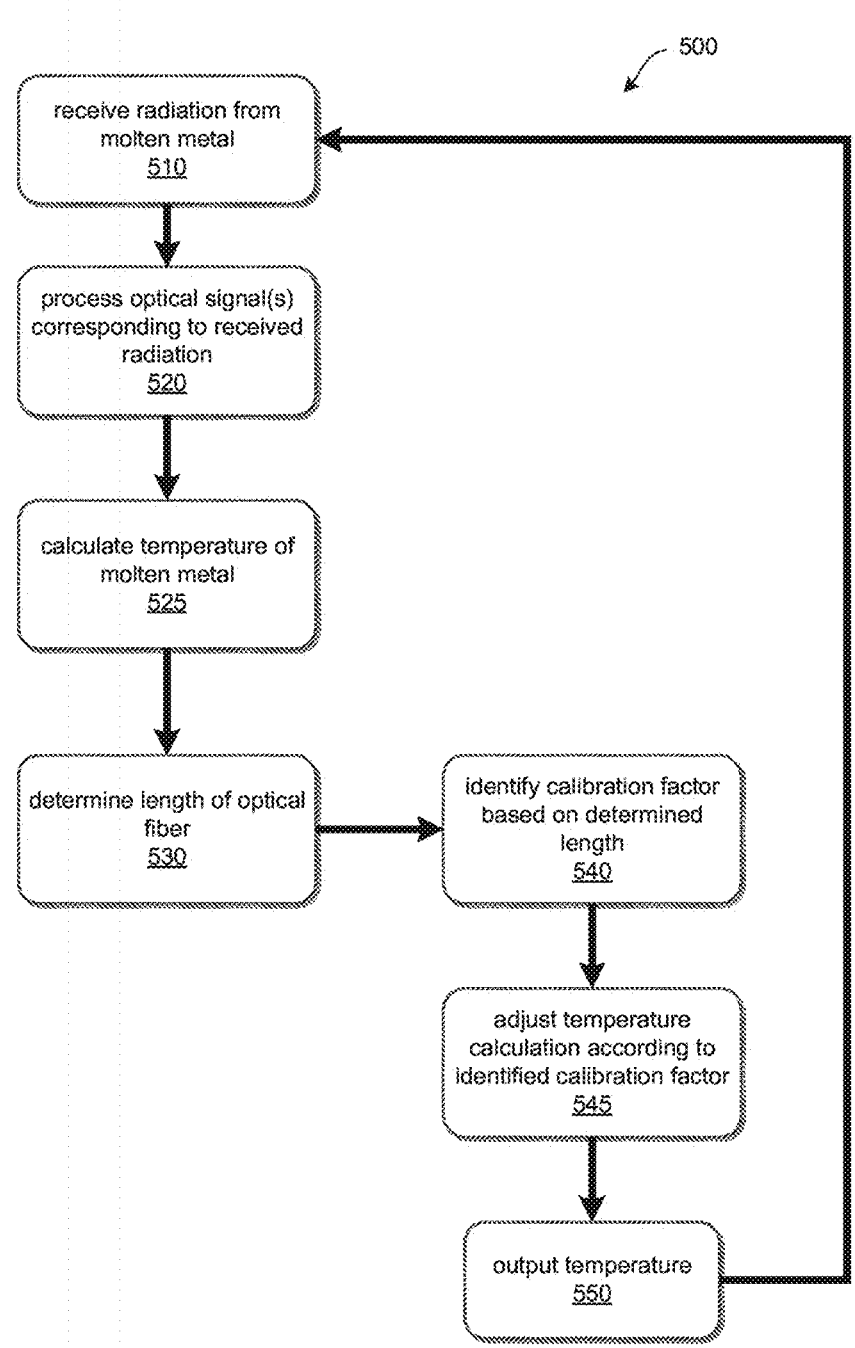
FIG. 5 is a flow diagram of a method for measuring temperature of molten metal with an optical probe, according to some embodiments.

The optical probe may be used for making temperature measurements according to several different methods. A non-limiting example of a method 500 for measuring temperature of molten metal continuously is depicted in FIG. 5. According to some embodiments, a method for measuring temperature of molten metal contained in a vessel may comprise receiving 510 radiation from the molten metal 120 at a detection end 232 of an optical probe 150 that is mounted in a vessel wall. An optical signal or multi-wavelength signals derived from the received radiation (e.g., converted to electrical signals by infrared detectors or photodetectors) may be processed 520 by a processor (e.g., a computer or microprocessor). Signal processing may comprise noise reduction techniques and may involve comparing the detected signal or signals to one or more reference signals. In some embodiments, signal processing may comprise fitting an equation with adjustable parameters to data representative of the processed signals. The method 500 may further include calculating 525 a temperature of the molten metal. The temperature may be calculated using any suitable technique, e.g., optical pyrometry techniques.

According to some embodiments, the method 500 for measuring temperature of molten metal may further comprise determining a length of optical fiber used for the measurement. As described above, a sacrificial region of the optical probe 150 may erode during continuous measurements of molten metal in a manufacturing run or "heat" of the metal. Changes in optical fiber length can affect the accuracy of the temperature measurement. Changes in fiber length may be determined, in some embodiments, from abrupt transitions in detected optical signals as described above in connection with FIG. 4. In some implementations, changes in fiber length may be determined based upon a time of use of the optical probe. For example, a fiber length may be calculated based upon a known erosion rate of the sacrificial portion of the probe, the time of use of the probe, and the melt conditions.

After determining the length of the optical fiber 230, a calibration factor may be identified 540. In some embodiments, a calibration factor may be identified from a look-up table, or calculated from an equation. The calibration factor may be used, in some embodiments, to adjust 545 a temperature calculation of the molten metal. For example, the calibration factor may be used to offset a calculated temperature, or may be used in an equation to calculate 525 the temperature of the molten metal.

According to some embodiments, the act of determining 530 a length of the optical fiber may not be executed in a temperature measurement process. Instead, a calibration factor may be determined based upon a time of use of the probe and the melt conditions.

The method 500 may output 550 a temperature of the metal. The output temperature may be provided for digital storage in some embodiments. In some implementations, the output temperature may be provided to a heating control unit as a feedback parameter. The heating control unit may control an amount of power used to heat the molten metal. The method 500 of measuring temperature may cycle (return to step 510) rapidly and continuously during a heating run of the metal. The cycling frequency may be in a range between about 0.1 Hz and about 10 Hz during a temperature measurement interval. In some embodiments, only one temperature measurement may be made in a temperature measurement interval.

Figure 6:
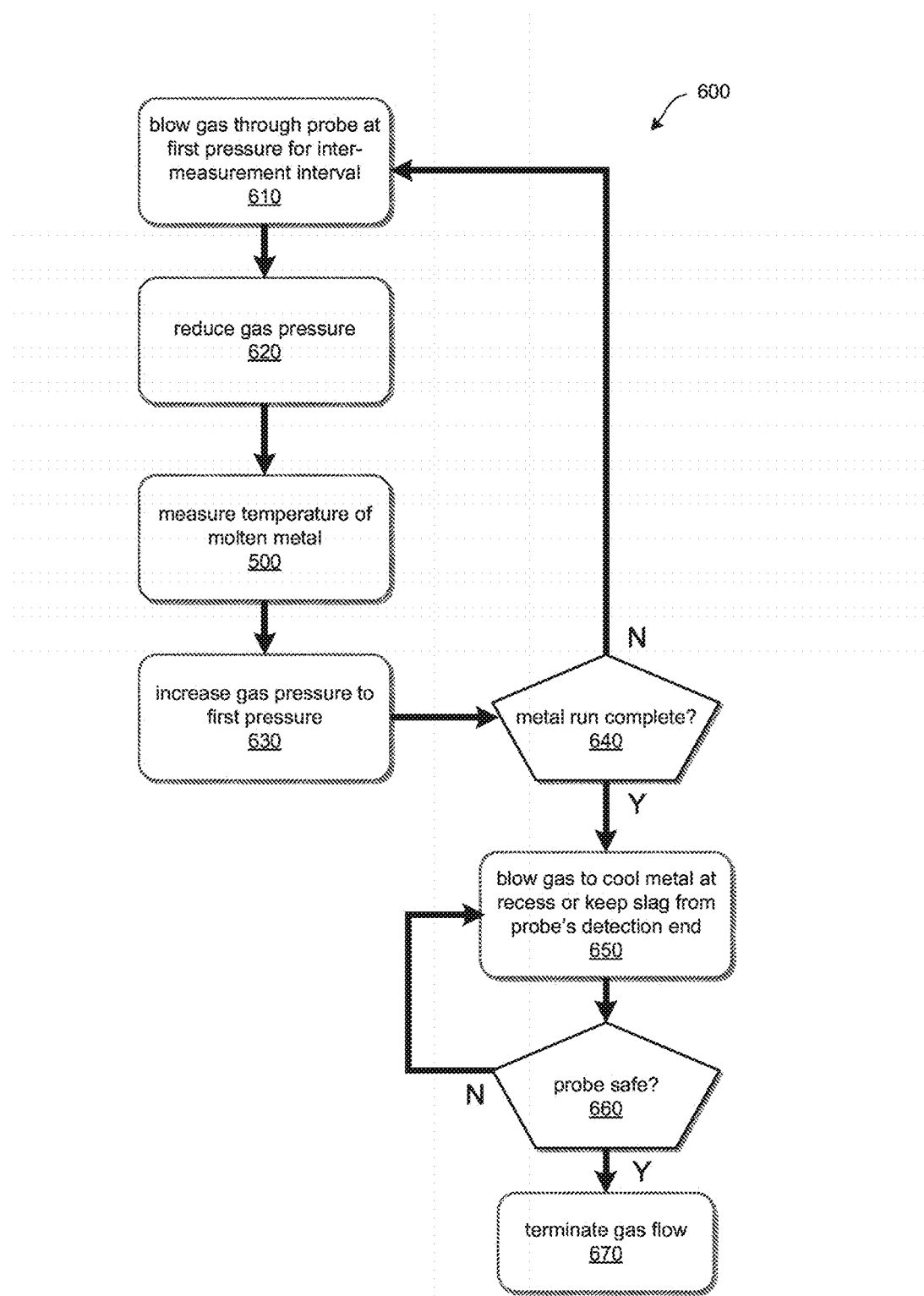
FIG. 6 is a flow diagram of a method for measuring temperature of molten metal with an optical probe in which pressurized gas may be used at intervals of the measurement process, according to some embodiments.

FIG. 6 depicts a temperature measurement method in which gas may be blown through the optical probe 150 at various times. In some embodiments, a method 600 of measuring temperature may comprise blowing a gas (e.g., an inert gas such as nitrogen or argon) through a porous body surrounding sidewalls of the optical fiber. According to some embodiments, pressurized gas may be blown 610 through a porous portion of the probe body toward the detection end of the probe at a first pressure during intervals between temperature measurements. For example, the gas may be blown at a pressure that reduces or minimizes erosive action of the molten metal on the detection end of the probe. In some implementations, the pressure may be high enough to create a gas cavity between the detection end of the probe or fiber and the molten metal. Reducing erosive action between temperature measurements can extend the lifetime of the optical probe 150.

Before a temperature measurement is made, the gas pressure may be reduced 620. In some embodiments, the pressure is reduced to a low value that allows contact of the molten metal with the optical probe and fiber, and gently agitates or stirs the liquid metal in the vicinity of the probe so as to homogenize the temperature in that region. In some embodiments, the pressure is reduced to a low value in which a small air cavity is maintained between the optical fiber 230 and the molten metal. Radiation from the molten metal may travel through the air cavity and be received by the optical fiber. In some embodiments, the gas pressure is reduce to standard pressure, or the gas flow is terminated, so as to allow the molten metal to directly contact the detection end of the optical fiber 230. After reduction of the gas pressure, acts of measuring temperature 500 may then be executed. One or more temperature measurements may be made in a temperature measurement interval.

The gas pressure may be increased 630 to the first pressure following a temperature measurement. The system may then determine 640 whether the run for the metal, or the metal heat, has completed. If the run is not complete, then the system may return to blowing gas 610 for the inter-measurement interval. If the run is complete for the batch in the vessel, the gas may be blown 650 to either cool metal at the detection end of the optical probe 150 (e.g., to solidify metal in a recess 208), or to keep liquid metal and slag away from the detection end of the optical fiber 230. Gas blown for cooling the metal may be at a pressure lower than the pressure used between temperature measurements.

In some embodiments, the system may determine 660 whether the detection end of the optical probe 150 is safe from damage by slag. A safe indication may be obtained when a temperature measurement drops to a constant value, e.g., to indicate that metal has solidified over the detection end of the probe, or that the probe is exposed to air. In some implementations, a safe indication may be obtained when a level sensor indicates that a level of slag is below the location of the probe. In some embodiments, a sudden increase in gas pressure may indicate that metal has solidified in the recess 208, and may provide an indicator that the probe is safe from potential damage. If it is determined that the probe is not safe, the act of blowing gas 650 to cool the metal or keep slag away from the probe's detection end may be continued. If it is determined that the probe is safe, the gas pressure may be reduced, so as to terminate the gas flow through the optical probe.

In some embodiments, only a portion of the probe's protective structure around the optical fiber may be porous, and the gas blown through the porous portion may exit into the vessel from one side of the optical probe. The gas may exit on a side of the optical probe that is above the optical fiber. For example, in some cases bubbles introduced by the gas may interfere with an optical temperature measurement as they pass by the detection end 232 of the optical fiber 230. To keep bubbles from the end of the fiber, the porous portion may be formed only on an upper half of the probe's protective structure. The protective structure and porous portion may be asymmetric in cross section, or the probe may have a feature indicating a location of the porous portion, so as to facilitate mounting of the probe in the vessel with the porous portion upward of the optical fiber. Bubbles emerging from the porous portion may emerge above the fiber, and still create a convection current of liquid metal across the face of the optical fiber. The convection current may assist in homogenizing temperature near the probe.

The acts of blowing gas through the porous body 225 of the optical probe 150 may be used in any suitable combination with acts of measuring temperature of the liquid metal. Any suitable optical probe described in the above embodiments described in connection with FIGS. 2A-3D may be used in a method for measuring temperature of the liquid metal.

Figure 7:
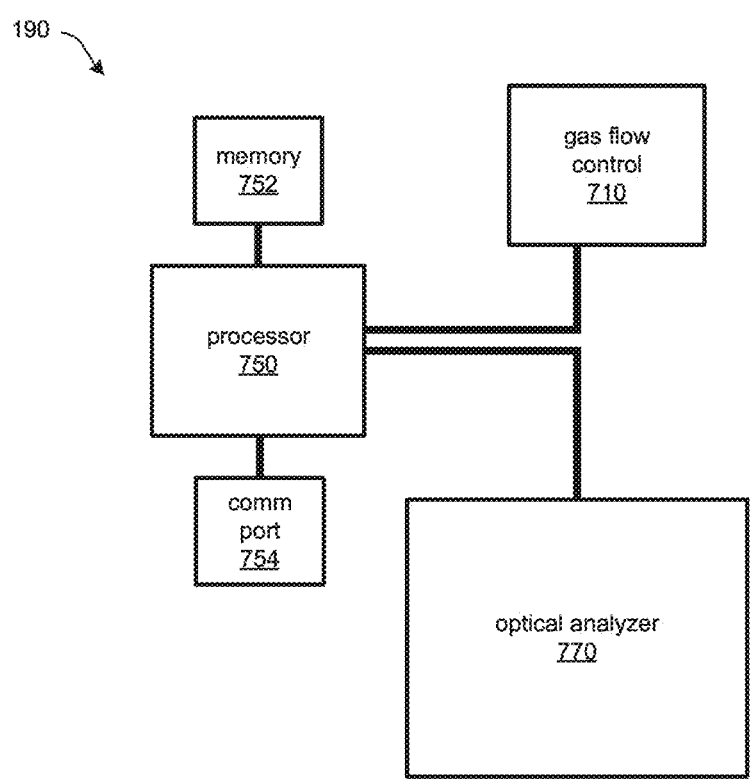
FIG. 7 depicts components that may be used for signal analysis and control of an optical probe, in some embodiments.

FIG. 7 depicts elements that may be included with signal analysis and control apparatus 190, in some embodiments. The signal analysis and control apparatus may be used to receive the optical radiation from the transmission optical fiber 160 and process the corresponding signals to obtain a temperature of the melt 120. The signal analysis and control apparatus 190 may also be used, in some implementations, to control the flow of gas before, during, and after temperature measurements according to any of the above-described methods.

In some embodiments, the signal analysis and control apparatus 190 comprises gas flow control apparatus 710, at least one processor 750, and an optical analyzer 770. The components may be provided in separate instruments linked by data communication lines or wireless data links, or may be provided as a single instrument. In some embodiments, the gas flow control apparatus and optical analyzer may each include a processor in communication with each other. The signal analysis and control apparatus 190 may further include digital memory 752 and at least one data communication port 754 for receiving and transmitting data to external circuitry.

The gas flow control apparatus 710 may include gas flow tubes, valves and electrical actuators that are operated to control the flow of gas to the optical probe before, during, and after temperature measurements. The electrical actuators may be controlled by instructions received from the processor 750. In some embodiments, the gas flow control apparatus 710 may further include one or more pressure sensors and one or more pressure regulators. The pressure regulators may be manually adjustable, or may be electronically controlled. The pressure sensors may provide pressure signals that can be transmitted to the processor 750.

The optical analyzer 770 may include one or more infrared and/or visible detectors and associated electronics (amplifiers, filters, analog-to-digital encoders, digital signal processors, etc.) that are used to receive radiation from the transmission optical fiber 160 and produce analog and/or digital signals representative of the received radiation. In some embodiments, the optical analyzer 770 may include a processor 750 that is configured to determine a temperature based upon the analog and/or digital signals representative of the received radiation. In some implementations, the optical analyzer 770 may comprise an optical pyrometer.

The processor 750 may comprise any type and form of data processing device, e.g., any one or combination of a microprocessor, microcontroller, a digital signal processor (DSP), an application specific integrated circuit (ASIC), and at least one field-programmable gate array (FPGA). There may be more than one processor in the system in some embodiments, e.g., dual core or multi-core processors, or one or more processors communicating with at least one controlling processor. In some embodiments, a processor 750 for the system may comprise a dedicated FPGA or ASIC.

In some embodiments, at least some of the acts described above and associated temperature measurement and/or gas flow control may be implemented as machine-readable instructions that can be loaded onto a processor 750 of the signal analysis and control apparatus 190. The machine-readable instructions may be stored as software on manufactured computer readable medium (e.g., magnetic tape, a hard disc, a compact disc (CD), etc.) or on digital memory devices (e.g., flash memory devices, USB memory sticks, RAM, ROM, etc.). In some implementations, the machine-readable instructions may be embodied as firmware on an instrument.

The technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Additionally, a method may include more acts than those illustrated, in some embodiments, and fewer acts than those illustrated in other embodiments.

The terms "approximately," "substantially," and "about" may be used to mean within ±20% of a target dimension in some embodiments, within ±10% of a target dimension in some embodiments, within ±5% of a target dimension in some embodiments, and yet within ±2% of a target dimension in some embodiments. The terms "approximately," "substantially," and "about" may include the target dimension.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An optical probe for mounting in a vessel wall to measure temperature of molten metal contained in the vessel, the optical probe comprising:
    an optical fiber having a detection end;
    a protective body surrounding sidewalls of the optical fiber;
    a sacrificial portion of the optical fiber and protective body; and
    an outer casing connected to at least the protective body and including a fastening mechanism for mounting the optical probe to the vessel wall, wherein the protective body does not cover the detection end of the optical fiber, and wherein, when mounted in the vessel wall, the detection end of the optical fiber is approximately flush with an inner surface of a refractory lining of the vessel wall, wherein the sacrificial portion comprises a length of the protective body having regularly spaced notches.

2. The optical probe of claim 1, wherein the optical fiber comprises sapphire, quartz, fused silica, or magnesium fluoride.

3. The optical probe of claim 1, wherein the protective body comprises any one or a combination of materials selected from the following list: zirconia, magnesia partially stabilized zirconia, calcia partially stabilized zirconia, yttria partially stabilized zirconia, alumina, graphite, boron nitride, magnesia, silica, and magnesia carbon.

4. The optical probe of claim 1, further comprising a porous body surrounding the protective body, wherein the porous body comprises at least one refractory material.

5. The optical probe of claim 4, wherein the porous body comprises any one or a combination of materials selected from the following list: alumina, magnesium oxide, magnesia carbon, silica, graphite, and spinel.

6. The optical probe of claim 4, wherein only a portion of the porous body is porous.

7. The optical probe of claim 6, wherein the porous body is asymmetric in cross section.

8. An optical probe for mounting in a vessel wall to measure temperature of molten metal contained in the vessel, the optical probe comprising:
    an optical fiber having a detection end;
    a protective body surrounding sidewalls of the optical fiber;
    a sacrificial portion of the optical fiber and protective body; and
    an outer casing connected to at least the protective body and including a fastening mechanism for mounting the optical probe to the vessel wall, wherein the protective body does not cover the detection end of the optical fiber, and wherein, when mounted in the vessel wall, the detection end of the optical fiber is approximately flush with an inner surface of a refractory lining of the vessel wall, wherein the optical fiber is scored at regular intervals to facilitate cleavage of the optical fiber.

9. The optical probe of claim 8, wherein the sacrificial portion comprises zirconia ferrules assembled along the optical fiber.

10. The optical probe of claim 8, wherein the protective body comprises any one or a combination of materials selected from the following list: zirconia, magnesia partially stabilized zirconia, calcia partially stabilized zirconia, yttria partially stabilized zirconia, alumina, graphite, boron nitride, magnesia, silica, and magnesia carbon.

11. The optical probe of claim 8, further comprising a porous body surrounding the protective body, wherein the porous body comprises any one or a combination of materials selected from the following list: alumina, magnesium oxide, magnesia carbon, silica, graphite, and spinel.

12. The optical probe of claim 11, wherein only a portion of the porous body is porous.

13. The optical probe of claim 11, wherein the porous body is asymmetric in cross section.

14. An optical probe for mounting in a vessel wall to measure temperature of molten metal contained in the vessel, the optical probe comprising:
    an optical fiber having a detection end;
    a protective body surrounding sidewalls of the optical fiber;
    a sacrificial portion of the optical fiber and protective body;
    an outer casing connected to at least the protective body and including a fastening mechanism for mounting the optical probe to the vessel wall, wherein the protective body does not cover the detection end of the optical fiber, and wherein, when mounted in the vessel wall, the detection end of the optical fiber is approximately flush with an inner surface of a refractory lining of the vessel wall; and
    a fiber connector at a transmission end of the optical fiber opposite the detection end, wherein the fiber connector is configured to connect a transmission optical fiber to the optical fiber.

15. The optical probe of claim 14, further comprising an optical detection apparatus configured to receive radiation from the transmission optical fiber and compute a temperature of the molten metal based upon the received radiation.

16. The optical probe of claim 15, wherein the optical detection apparatus includes temperature calibration factors that are dependent upon a time of exposure of the optical probe to molten metal.

17. The optical probe of claim 14, wherein the sacrificial portion comprises a length of the protective body having regularly spaced notches.

18. The optical probe of claim 14, wherein the optical fiber is scored at regular intervals to facilitate cleavage of the optical fiber.

19. The optical probe of claim 14, wherein the protective body comprises any one or a combination of materials selected from the following list: zirconia, magnesia partially stabilized zirconia, calcia partially stabilized zirconia, yttria partially stabilized zirconia, alumina, graphite, boron nitride, magnesia, silica, and magnesia carbon.

20. The optical probe of claim 14, further comprising a porous body surrounding the protective body, wherein the porous body comprises any one or a combination of materials selected from the following list: alumina, magnesium oxide, magnesia carbon, silica, graphite, and spinel.

21. The optical probe of claim 20, wherein only a portion of the porous body is porous.

22. The optical probe of claim 20, wherein the porous body is asymmetric in cross section.

23. An optical probe for mounting in a vessel wall to measure temperature of molten metal contained in the vessel, the optical probe comprising:
an optical fiber having a detection end;
a protective body surrounding sidewalls of the optical fiber;
a sacrificial portion of the optical fiber and protective body; and
an outer casing connected to at least the protective body and including a fastening mechanism for mounting the optical probe to the vessel wall, wherein the protective body does not cover the detection end of the optical fiber, and wherein, when mounted in the vessel wall, the detection end of the optical fiber is approximately flush with an inner surface of a refractory lining of the vessel wall, wherein the outer casing includes a flange that registers the optical probe to an exterior wall of the vessel, and wherein an insertion length L of the optical probe extending beyond the flange is approximately equal to a thickness of the vessel wall.

24. The optical probe of claim 23, wherein the length L is between 50 mm and 1000 mm.

25. The optical probe of claim 23, wherein the sacrificial portion comprises a length of the protective body having regularly spaced notches.

26. The optical probe of claim 23, wherein the optical fiber is scored at regular intervals to facilitate cleavage of the optical fiber.

27. The optical probe of claim 23, wherein the protective body comprises any one or a combination of materials selected from the following list: zirconia, magnesia partially stabilized zirconia, calcia partially stabilized zirconia, yttria partially stabilized zirconia, alumina, graphite, boron nitride, magnesia, silica, and magnesia carbon.

28. The optical probe of claim 23, further comprising a porous body surrounding the protective body, wherein the porous body comprises any one or a combination of materials selected from the following list: alumina, magnesium oxide, magnesia carbon, silica, graphite, and spinel.

29. The optical probe of claim 28, wherein only a portion of the porous body is porous.

30. The optical probe of claim 28, wherein the porous body is asymmetric in cross section.

31. An optical probe for mounting in a vessel wall to measure temperature of molten metal contained in the vessel, the optical probe comprising:
an optical fiber having a detection end;
a protective body surrounding sidewalls of the optical fiber;
a sacrificial portion of the optical fiber and protective body;
an outer casing connected to at least the protective body and including a fastening mechanism for mounting the optical probe to the vessel wall, wherein the protective body does not cover the detection end of the optical fiber, and wherein, when mounted in the vessel wall, the detection end of the optical fiber is approximately flush with an inner surface of a refractory lining of the vessel wall; and
a brick of refractory material, wherein the brick has a hole extending through the brick into which the portion of the optical probe extending beyond the flange may be inserted.

32. The optical probe of claim 31, wherein the brick comprises any one or a combination of materials selected from the following list: alumina, magnesium oxide, magnesia carbon, zirconia, magnesia partially stabilized zirconia, calcia partially stabilized zirconia, yttria partially stabilized zirconia, scandia partially stabilized zirconia, graphite, boron nitride and spinel.

33. The optical probe of claim 31, wherein the brick comprises a recess around the hole on at least one side of the brick, and the recess has a transverse dimension greater than a depth into the brick, and sidewalls of the recess slope outward toward an outer surface of the brick.

34. The optical probe of claim 31, wherein the brick has a thickness that is greater than a thickness of a refractory lining of the vessel.

35. The optical probe of claim 31, wherein the sacrificial portion comprises a length of the protective body having regularly spaced notches.

36. The optical probe of claim 31, wherein the optical fiber is scored at regular intervals to facilitate cleavage of the optical fiber.

37. The optical probe of claim 31, wherein the protective body comprises any one or a combination of materials selected from the following list: zirconia, magnesia partially stabilized zirconia, calcia partially stabilized zirconia, yttria partially stabilized zirconia, alumina, graphite, boron nitride, magnesia, silica, and magnesia carbon.

38. The optical probe of claim 31, further comprising a porous body surrounding the protective body, wherein the porous body comprises any one or a combination of materials selected from the following list: alumina, magnesium oxide, magnesia carbon, silica, graphite, and spinel.

39. The optical probe of claim 38, wherein only a portion of the porous body is porous.

40. The optical probe of claim 38, wherein the porous body is asymmetric in cross section.

41. A method for measuring temperature of molten metal contained in a vessel, the method comprising:
receiving an optical signal from a detection end of an optical fiber that is mounted in a vessel wall, wherein the detection end of the optical fiber is proximal an inner surface of the vessel wall;
processing the optical signal to calculate a temperature of the molten metal;
determining a calibration factor corresponding to a change in optical fiber length during a measurement interval;
adjusting the calculated temperature based on the calibration factor;
blowing gas through a porous body surrounding sidewalls of the optical fiber at a first pressure when removing molten metal from the vessel, so as to prevent debris from attaching to the detection end of the optical fiber;
blowing gas through the porous body for a first time interval;
not blowing gas through the porous body during a second time interval when measuring a temperature of the molten metal; and
repeating the acts of blowing gas for the first time interval and not blowing gas for the second time interval to repeatedly measure the temperature of the molten metal.

42. The method of claim 41, further comprising blowing gas through the porous body at a second pressure that is less than the first pressure when measuring a temperature of the molten metal.

43. The method of claim 41, wherein the gas blown through the porous body for the first time interval is blown at a pressure that prevents the molten metal from contacting the detection end of the optical fiber.

44. The method of claim 41, wherein the second time interval is shorter than the first time interval.

45. The method of claim 41, wherein only a portion of the porous body is porous and the gas blown through the porous body exits into the vessel from one side of the optical probe.

46. The method of claim 45, wherein the gas exits on a side of the optical probe that is above the optical fiber.

47. The method of claim 41, wherein the temperature is representative of a temperature in an arc furnace, a converter, a basic oxygen furnace, a ladle, or a tundish used in metal manufacturing.

48. The method of claim 41, wherein the optical fiber comprises sapphire, quartz, fused silica, or magnesium fluoride.

* * * * *